(12) United States Patent
Zabovnik

(10) Patent No.: US 11,973,394 B2
(45) Date of Patent: Apr. 30, 2024

(54) BALANCED DUAL LINEAR DRIVE POWER SYSTEM

(71) Applicant: Damjan Zabovnik, Watsonville, CA (US)

(72) Inventor: Damjan Zabovnik, Watsonville, CA (US)

( * ) Notice: Subject to any disclaimer, the term of this patent is extended or adjusted under 35 U.S.C. 154(b) by 0 days.

(21) Appl. No.: 17/134,403

(22) Filed: Dec. 26, 2020

(65) Prior Publication Data

US 2021/0203216 A1    Jul. 1, 2021

Related U.S. Application Data

(60) Provisional application No. 63/048,656, filed on Jul. 7, 2020, provisional application No. 62/954,394, filed on Dec. 27, 2019.

(51) Int. Cl.
*H02K 41/03* (2006.01)
*H02P 6/00* (2016.01)

(52) U.S. Cl.
CPC .............. *H02K 41/03* (2013.01); *H02P 6/006* (2013.01)

(58) Field of Classification Search
CPC ...... H02K 41/03; H02K 41/031; H02K 33/02; H02K 33/06; H02K 35/02; H02K 35/00; H02P 6/006; A47C 3/0255; A47C 3/02

USPC .......................... 310/12.19, 12.31, 23, 30, 34
See application file for complete search history.

(56) References Cited

U.S. PATENT DOCUMENTS

| | | | |
|---|---|---|---|
| 357,374 A * | 2/1887 | Darling | H02K 7/065 310/23 |
| 2,683,481 A * | 7/1954 | Lorenz | A47C 3/0255 248/370 |
| 5,392,898 A | 2/1995 | Burgess et al. | |
| 5,460,259 A | 10/1995 | Burgess | |
| 5,584,375 A | 12/1996 | Burgess et al. | |
| 6,326,706 B1 * | 12/2001 | Zhang | F04B 35/045 310/12.32 |
| 2007/0193858 A1 | 8/2007 | Hillstrom et al. | |
| 2011/0109173 A1 * | 5/2011 | Sugita | H02K 41/031 310/12.18 |

* cited by examiner

*Primary Examiner* — Michael Andrews
(74) *Attorney, Agent, or Firm* — Michael A. Guth

(57) ABSTRACT

A linear drive system adapted for repetitive driving using a linear motor. Linkages are used to maintain the driven portion in linear motion. A coupled dual drive system in which two driven portions are coupled such that their coupled motions travel at the same velocity in opposed directions. A linear drive system with a return spring portion which is adapted to facilitate linear direction changeover. A coupled linear drive system which may be used as a mechanical power source for drive systems used in transportation and industry.

4 Claims, 25 Drawing Sheets

BALANCED DUAL LINEAR DRIVE POWER SYSTEM

CROSS-REFERENCE TO RELATED APPLICATIONS

This application claims priority to U.S. Provisional Patent Application No. 62/954,394 to Zabovnik, filed Dec. 27, 2019, which is hereby incorporated by reference in its entirety. This application claims priority to U.S. Provisional Patent Application No. 63/048,656 to Zabovnik, filed Jul. 7, 2020, which is hereby incorporated by reference in its entirety.

BACKGROUND

Field of the Invention

The present invention relates to an electric linearly driven power system, and more specifically to a balanced, linked, dual liner drive power system.

SUMMARY OF THE INVENTION

A linear drive system adapted for repetitive driving using a linear motor. Linkages are used to maintain the driven portion in linear motion. A coupled dual drive system in which two driven portions are coupled such that their coupled motions travel at the same velocity in opposed directions. A linear drive system with a return spring portion which is adapted to facilitate linear direction changeover. The coupled linear drive system which may be used as a mechanical power source for drive systems used in transportation and industry.

DETAILED DESCRIPTION

Various methods of supporting powered drivetrains are used in industry, including bearings and bushings. Friction in these supporting devices, and lubrication of these supporting devices, are important aspects of drivetrain support. However, linkage based systems may be used which reduce or eliminate the need for these common support devices.

Figure 1:
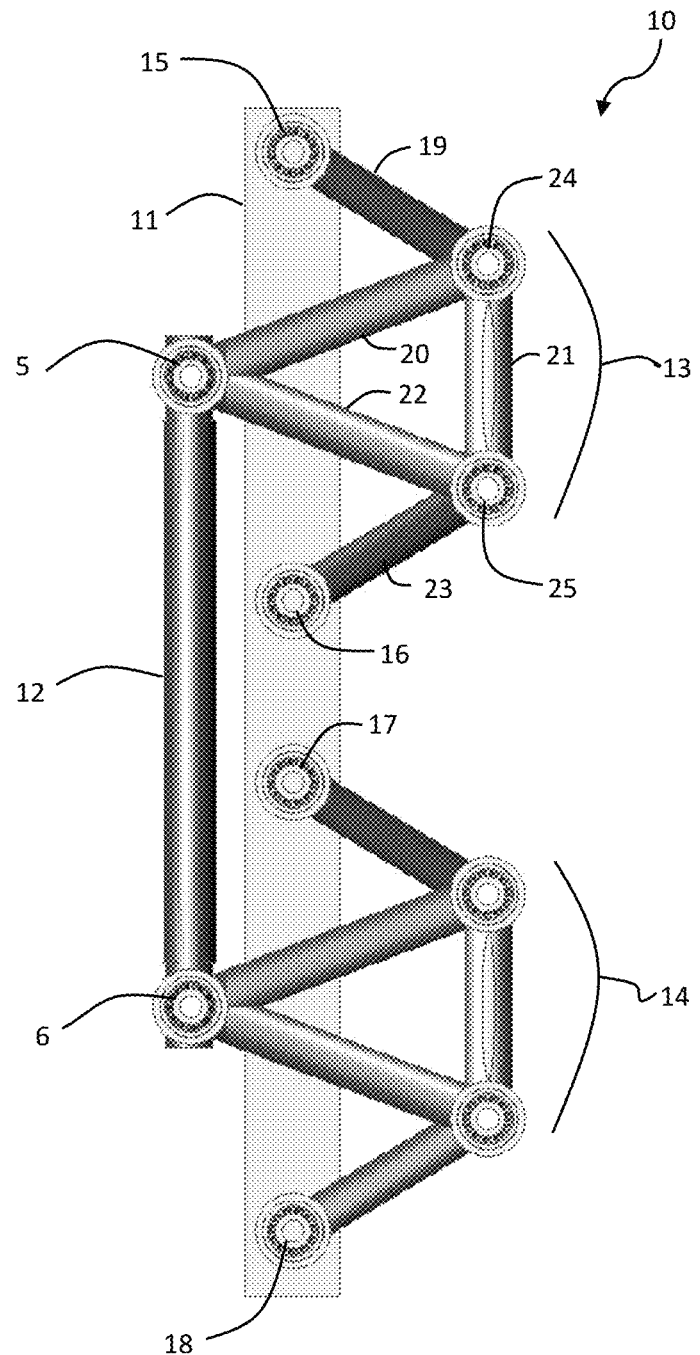
FIG. 1 is a view of a linkage based system.

In some embodiments of the present invention, as seen in FIG. 1, a linkage system 10 may include a base structure 11 which supports a first linkage subassembly 13 and a second linkage subassembly 14 whose design is adapted for allowing the linear motion of a drive rod 12. The linearity of the motion of such a drive rod is discussed further below. The first linkage subassembly 13 consists of two base links 19, 23 pivotally coupled to the base structure 11 at their first ends with bearings 15, 16. A joining link 21 is pivotally coupled to the second end of the base links 19, 23 with bearings 24, 25. The rod links 20, 22 are also pivotally coupled to the second ends of the base links 19, 23 and then are pivotally coupled together at a first end of the drive rod 12 with a bearing 5. The second linkage subassembly 14 is similarly constructed and pivotally coupled to a second end of the drive rod 12 with a bearing 6. With such a construction, the drive rod will travel along a linear path (vertically in the view of FIG. 1) through a central drive range.

Figure 2A:
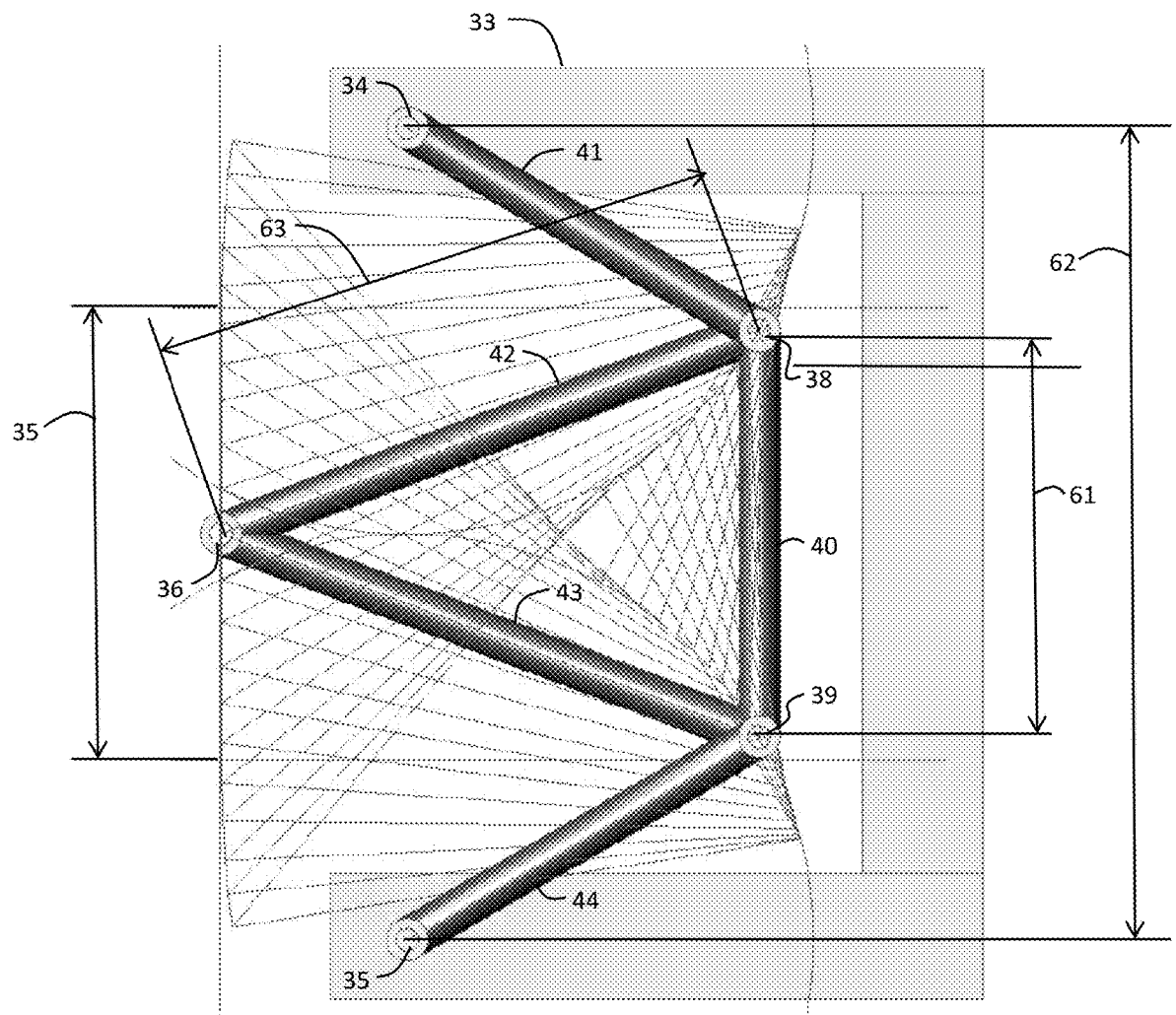
FIGS. 2A-C illustrate positions of a linkage based system.
Figure 2B:
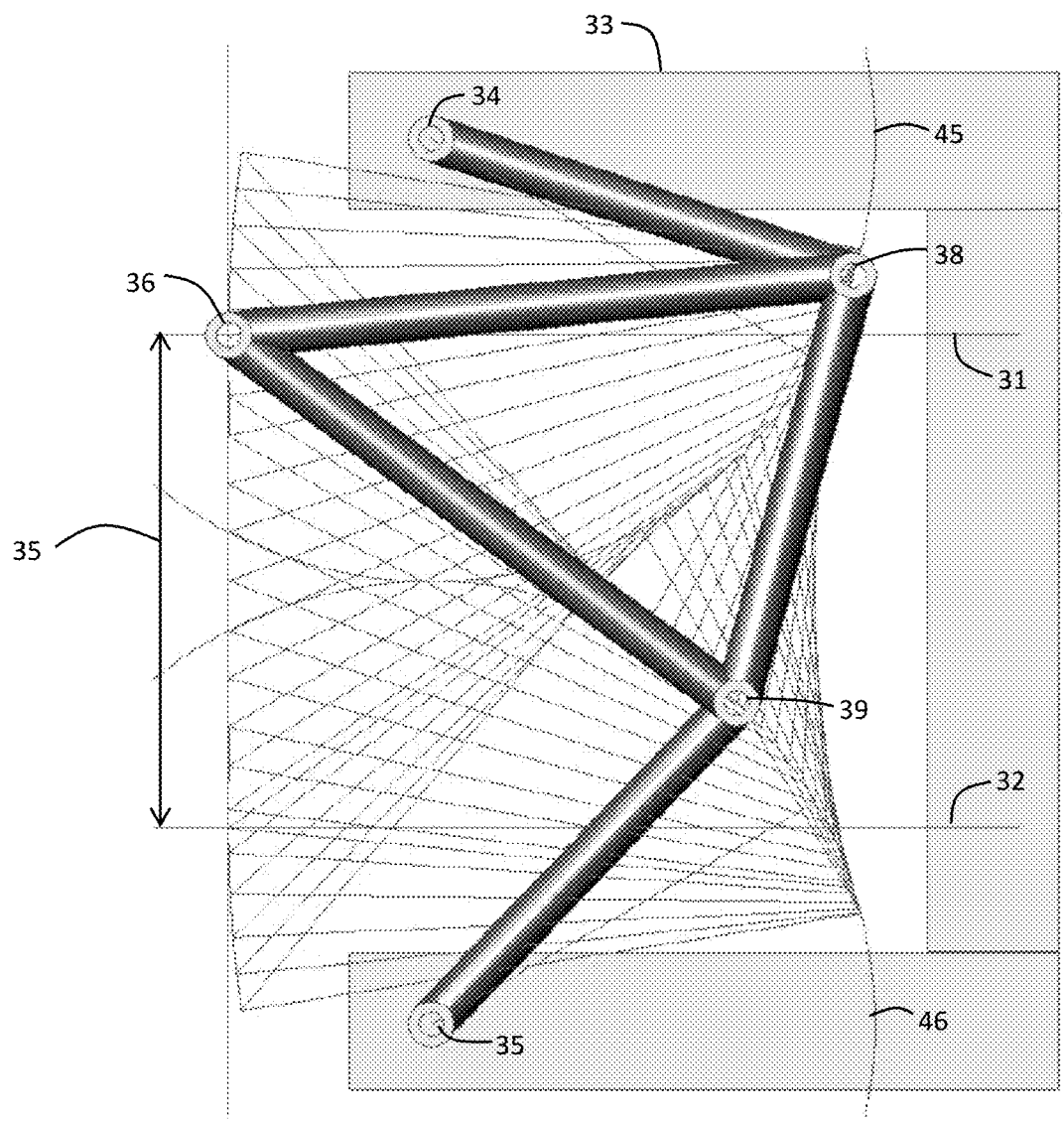
Figure 2C:
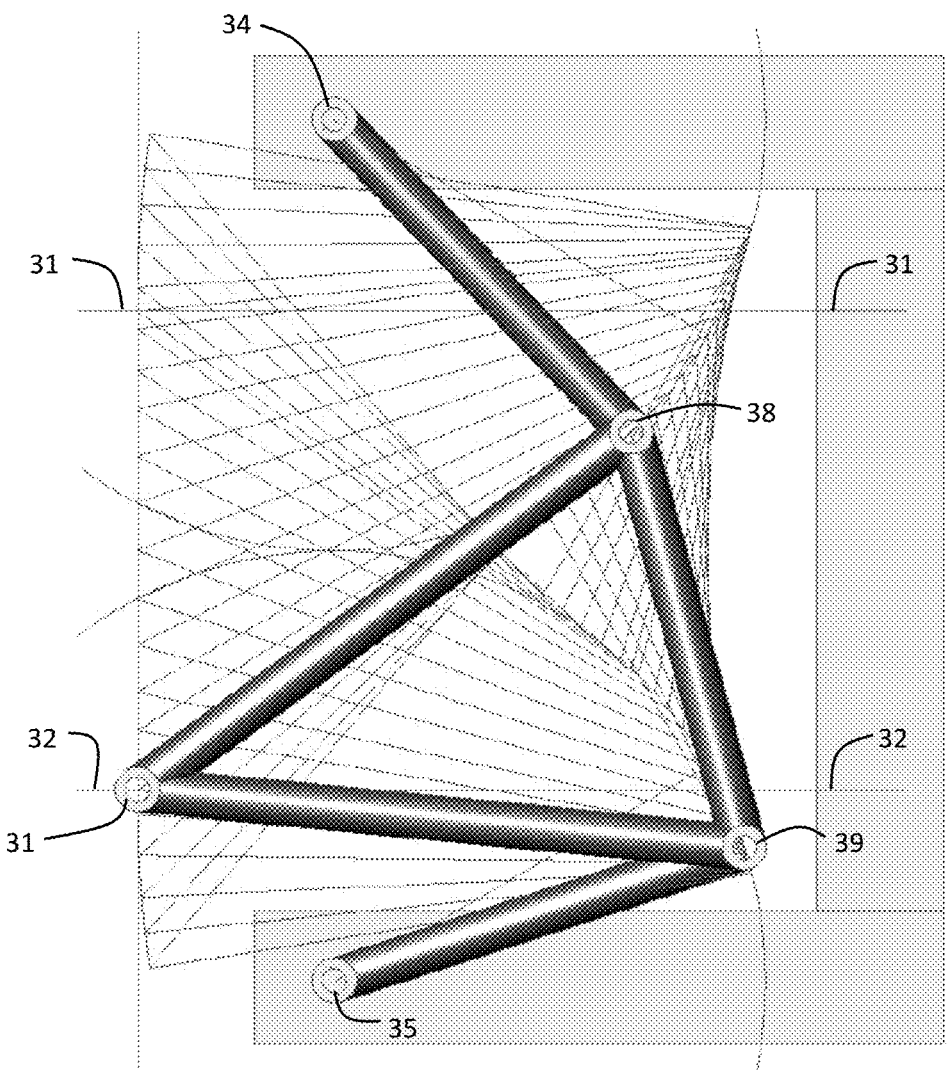

FIGS. 2A, 2B, and 2C are views of the center, top, and bottom of the linear travel path 35 of the drive link attachment 36 of a linkage subassembly. In this illustrative embodiment, and as seen in FIG. 2A, the linkage subassembly consists of two base links 41, 44 which are of the same length and are pivotally coupled to the base structure 33 at their first ends with base bearings 34, 35. A joining link 40 is pivotally coupled to the second end of the base links 41, 44 with bearings 38, 39. The rod links 42, 43 are of the same length and are also pivotally coupled to the second ends of the base links 41, 44 and then are pivotally coupled together with a drive link bearing 36. As the drive link bearing 36 moves in concert with the various pivoting actions in the linkage subassembly, there will be a motion range 35, or drive range, in which the drive link bearing 36 will move in a nearly perfectly straight line. The bearings 38, 39 of the second end of the base links 41, 44 will follow a curvilinear path 45, 46. In this illustrative embodiment, the spacing 62 between the base bearings 34, 35 is a distance that is twice the length 61 of the joining link 40, and the length 63 of the rod links is the length 61 of the joining link multiplied the square root of 2 (multiplied by approx. 1.414). The linear range, or drive range, 35 of the drive link bearing 36 will be in excess of 1.1 times the length of the joining link 40. FIG. 2B illustrates the linkage subassembly with the drive link bearing 36 at the top 31 of the linear range 35. FIG. 2C illustrates the linkage subassembly with the drive link bearing 36 at the bottom 32 of the linear range 35.

Figure 3:
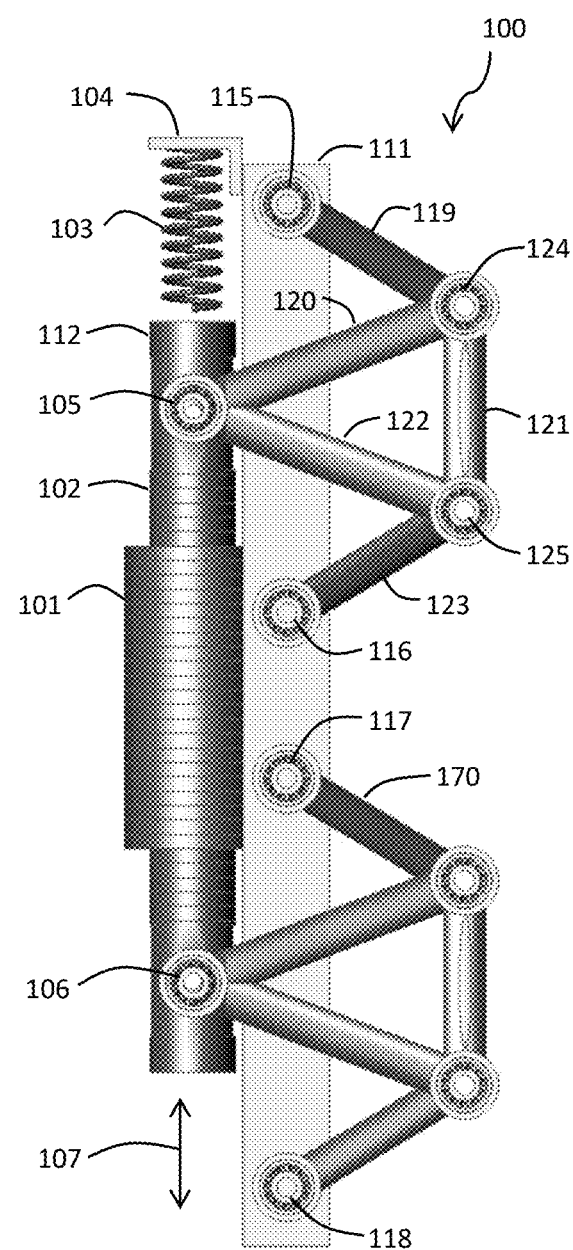
FIG. 3 is a view of a linearly driven linkage based system according to some embodiments of the present invention.

FIG. 3 illustrate a single linear drive system 100 according to some embodiments of the present invention. In this illustrative embodiment a first linkage subassembly consists of two base links 119, 123 which are of the same length and are pivotally coupled to the base structure 111 at their first ends with base bearings 115, 116. A joining link 121 is pivotally coupled to the second end of the base links 119, 123 with bearings 124, 125. The rod links 120, 122 are of the same length and are also pivotally coupled to the second ends of the base links 119, 123 and then are pivotally coupled together and to a first end of the drive rod 112 with a drive link bearing 105. Similarly, a second linkage subassembly is pivotally coupled to the second end of the drive rod 112 with a bearing 106, and to the base structure 111. The base bearings 115, 116, 117, 118 are in linear relationship.

The drive rod 102 is adapted to be driven by the outer linear drive motor portion 101. The outer linear drive motor portion 101 is fixedly coupled to the base structure 111 and may have an internal cylindrical surface through which the drive rod may be driven, and through which the drive rod may travel. In some aspects, the outer drive portion has a plurality of windings along its linear length. In some aspects, the drive rod has a plurality of magnets and iron rings along its length. The windings of the outer drive portion may be electrically coupled to a power drive system adapted to energize the windings as appropriate to accelerate or drive the drive rod, with its magnets and iron rings, along the drive axis of the linear drive system. As the drive rod 112 moves 107 (vertically as shown in FIG. 3) it travels through a linear path due to its coupling to the linkage subassemblies, as discussed above. Using the linkages which guide the drive rod along a linear path through its central drive range, the drive rod may travel through the outer linear drive motor portion without the need for bearings or bushings between the outer motor portion and the drive rod. The drive rod 112 may have an inner linear drive motor portion 102 adapted to interact with the outer linear drive motor portion 101. The outer linear drive motor portion 101 may have electric coils which are coupled to an electric power source adapted to provide pulsating DC current. The drive rod 112 may have ring magnets and iron rings. In an exemplary functionality, the drive rod 112 may be driven downward in a power stroke, which may transfer mechanical power to a drive system. As the drive rod 112 is driven by the linear drive motor it travels through a linear path due to its coupling to the linkage subassemblies. A spring 103 may be coupled to a spring bracket 104 which is in turn coupled to the base structure 111. As it reaches the extent of its power stroke, the spring 103 has worked to slow and stop the drive rod from over extension. The linear motor may then be driven in reverse and the drive rod is helped in its acceleration by the spring force. Similarly, as the drive rod reaches the extent of its reverse stroke, the spring 103 acts in similar fashion at the reverse end as well. In some aspects, the spring begins its retardation of the stroke in the final third of the central drive range. In some aspects, the spring begins its retardation of the stroke in the final fourth of the drive range. In some aspects, the retardation can begin as the drive rod leaves its centered position.

Figure 4:
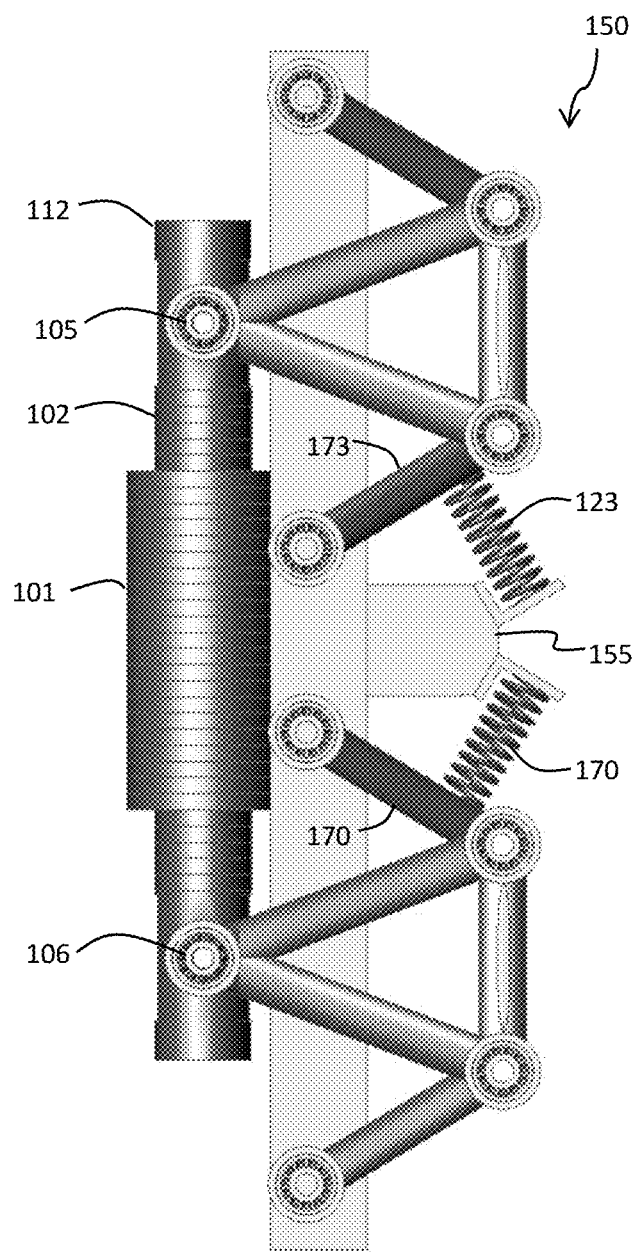
FIG. 4 is a view of a linearly driven linkage based system with springs according to some embodiments of the present invention.

FIG. 4 illustrates a second embodiment 150 of a single linear drive system 150 according to some embodiments of the present invention. A spring bracket 155 supports a first spring 123 and a second spring 170. The spring bracket 155 is coupled to the base structure 111. The first spring 123 is coupled to a first base link 173 and the second spring 179 is coupled to a second base link 170. The springs work to help slow, stop, and reverse the drive rod 112 as it changes drive directions. Using the linkages which guide the drive rod along a linear path through its central drive range, the drive rod may travel through the outer linear drive motor portion without the need for bearings or bushings between the outer motor portion and the drive rod.

Figure 5:
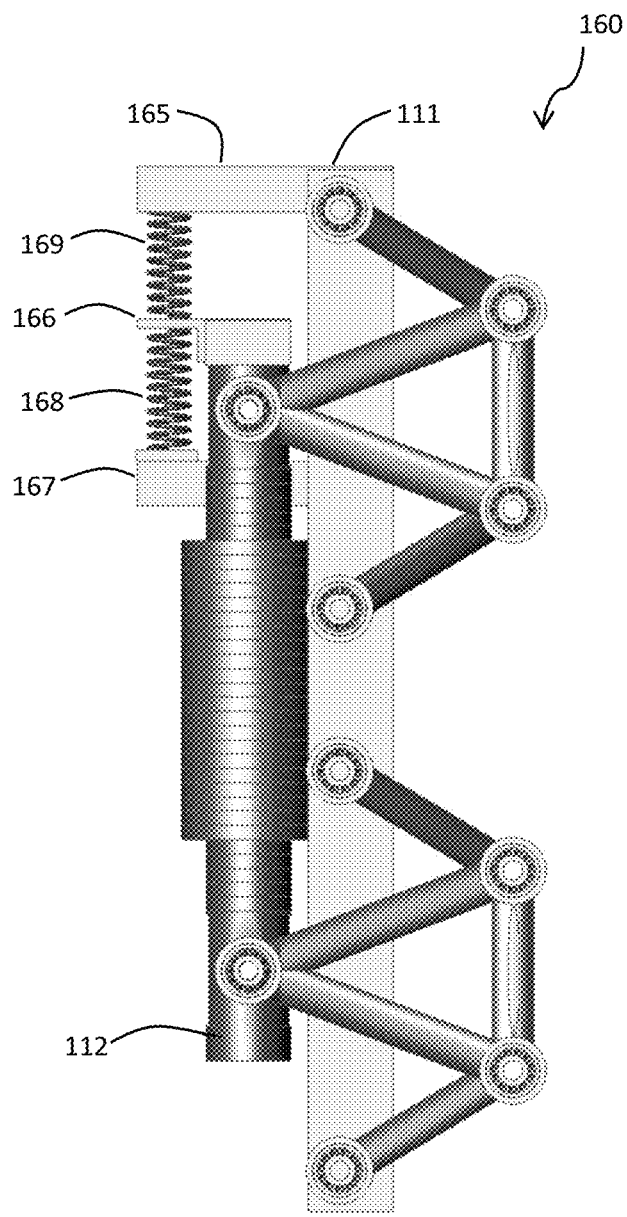
FIG. 5 is a view of a linearly driven linkage based system with springs according to some embodiments of the present invention.

FIG. 5 illustrates a third embodiment 160 of a single linear drive system 150 according to some embodiments of the present invention. Spring brackets 165, 166, 167 support a first spring 169 and a second spring 168. The intermediate spring bracket 166 is coupled to the drive rod 112, and the first and third spring brackets 165, 167 are coupled to the base structure 111. The springs work to help slow, stop, and reverse the drive rod 112 as it changes drive directions. Using the linkages which guide the drive rod along a linear path through its central drive range, the drive rod may travel through the outer linear drive motor portion (stator) without the need for bearings or bushings between the outer motor portion and the drive rod.

Figure 6:
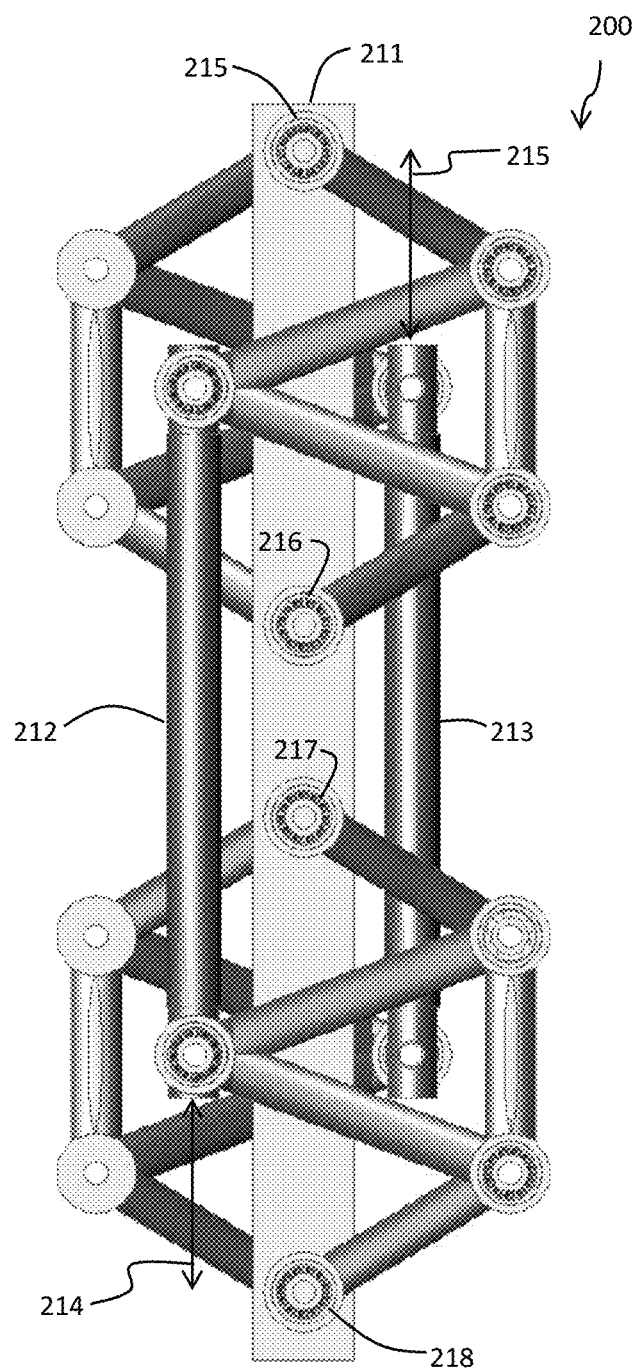
FIG. 6 is a view of a linearly driven linkage based dual system according to some embodiments of the present invention.
Figure 7:
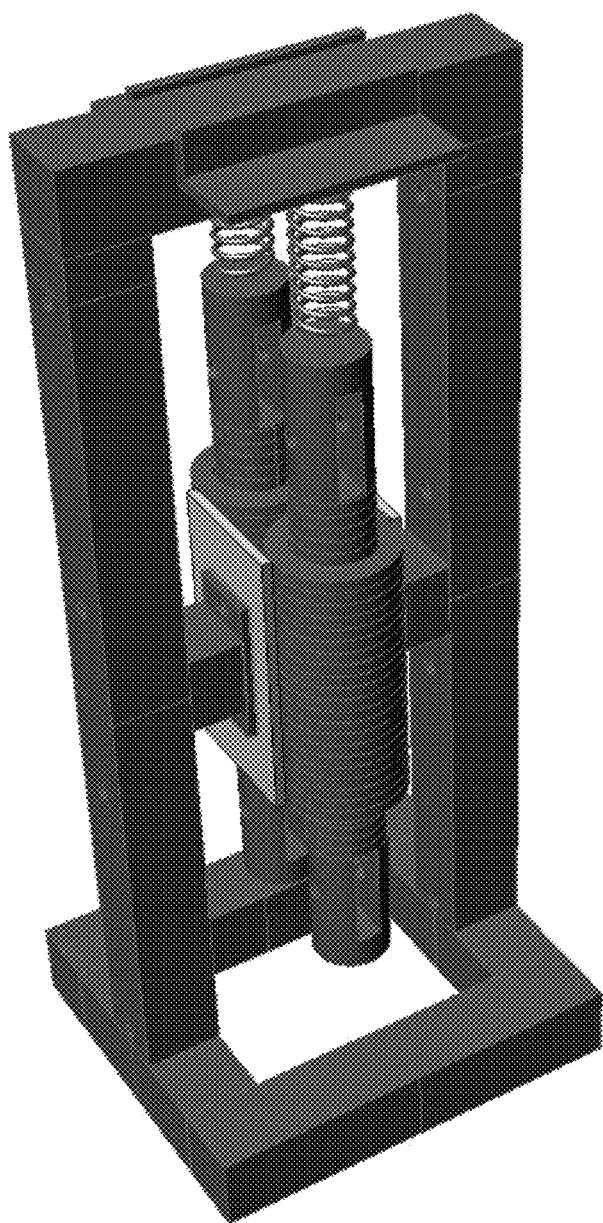
FIG. 7 is a partial view of a linearly driven system with springs according to some embodiments of the present invention.

In some embodiments of the present invention, as seen in FIG. 6, a dual linear drive system 200 couples two linear drive systems to a single base structure 211. The first drive rod 212 moves along a first linear path 214 and the second drive rod 213 moves along a second linear path 215. The first linear drive system and the second linear drive system share coupling points 215, 216, 217, 218 on the base structure 211. The compact configuration of the dual linear drive system allows for two drive rods in close proximity. The drive rods 212, 213 may be further coupled to apparatus for motive transport, or for other uses. Although not illustrated in this view of FIG. 6, the drive rods 212, 213, may each have linear drive motors as discussed above. In this illustrative embodiment, a very compact configuration is achieved. In this illustrative embodiment, although the first linear drive system and the second drive system share coupling position to a single base structure, they nevertheless are free to operate independently. FIG. 7 illustrates a base structure with a first and second linear motor assembly affixed thereto. The motor external drive portions are fixedly coupled to the base structure. The motor drive rods are able to travel along their drive axes. The linkage assemblies are omitted in FIG. 7 for clarity.

Figure 8:
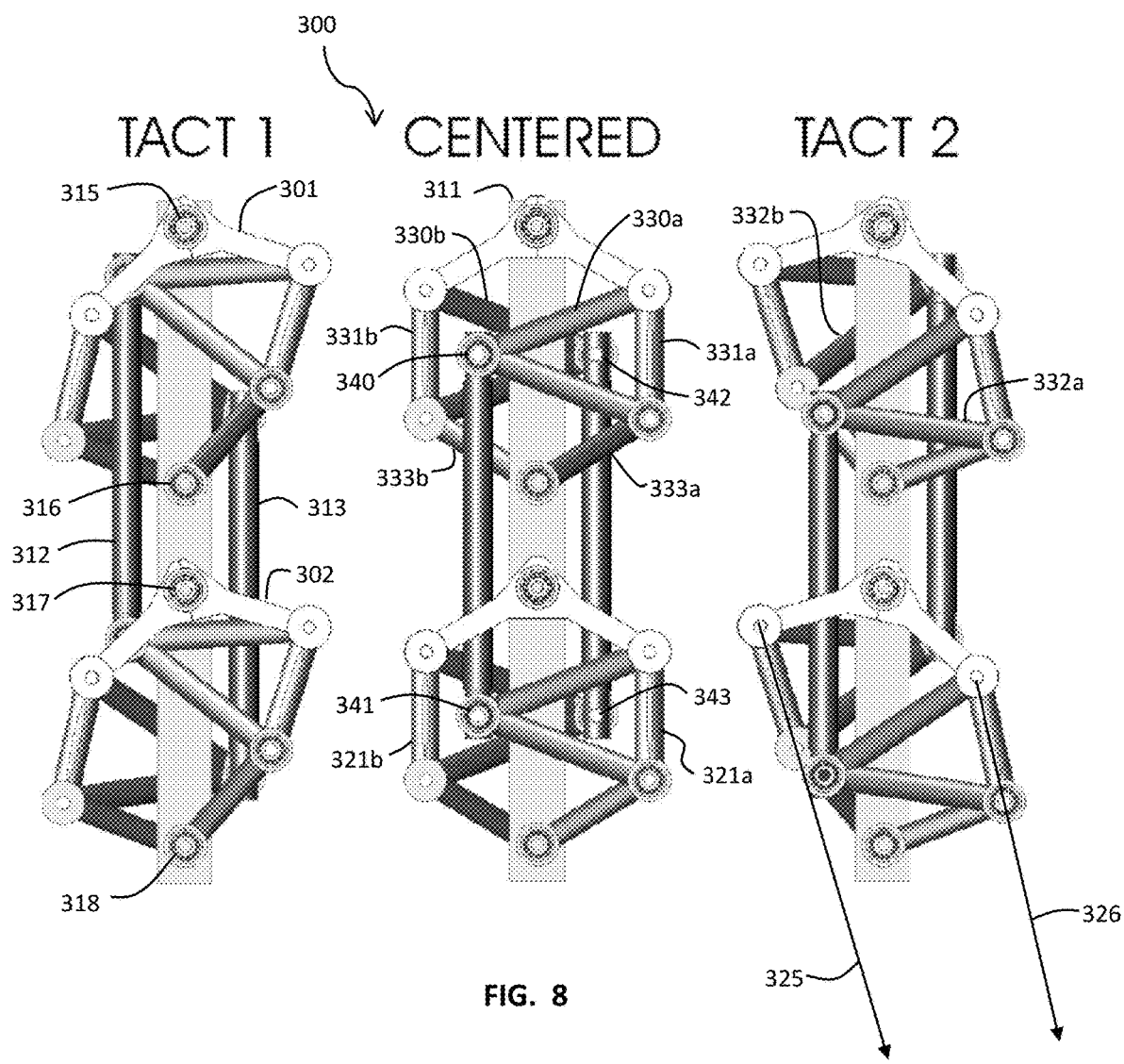
FIG. 8 is a view of a linearly driven linkage based dual system according to some embodiments of the present invention.

In some embodiments of the present invention, as seen in FIG. 8, a linked dual linear drive system 300 couples the motion of the first linear drive system to the second linear drive system. A first linkage subassembly of the first linear drive system consists of a base link 333a which is pivotally coupled to the base structure 311 at a first end with a base bearing 316. A joining link 331a is pivotally coupled to the second end of the base link. The rod links 330a, 332a are of the same length and are also pivotally coupled to the second ends of the base links and then are pivotally coupled together and to a first end of the drive rod 312 with a drive link bearing 340. The other base link 301, however, is a coupled base link which couples the motion of the first linear drive system to the second linear drive system. This connection base link 301, and the second connection base link 302, couple the up motion of one drive rod to the down motion of the other drive rod.

A first linkage subassembly of the second linear drive system consists of a base link 333b which is pivotally coupled to the base structure 311 at a first end with a base bearing. A joining link 331b is pivotally coupled to the second end of the base link. The rod links 330b, 332b are of the same length and are also pivotally coupled to the second ends of the base links and then are pivotally coupled together and to a first end of the drive rod 313 with a drive link bearing 342. The other base link 301, however, is a coupled base link which couples the motion of the second linear drive system to the first linear drive system Similarly, a second linkage subassembly of the first linear drive system is pivotally coupled to the second end of the drive rod 312 with a bearing 341, and to the base structure 311. The base bearings 315, 316, 317, 318 are in linear relationship. A joining link 321a is pivotally coupled to the second end of a base link. A joining link 302 couples the second linkage subassembly of the first linear drive system to the second linkage subassembly of the second linear drive system. The second linkage subassembly of the second linear drive system has a coupled joining link 321b that is similarly coupled to the second linkage subassembly of the first linear drive system.

In the exemplary embodiment of FIG. 8, a very compact linked dual drive system 300 allows for linked driving of a power system when configures with linear drive motors as described above. FIG. 8 illustrates the range motion of the system as the drive rods 312, 313 move up and down, as they would under powered driving. In this configuration, although the joining links 331a, 331b, 321a, 321b are parallel in the mid-range centered position, as the range is extended the attitudinal positions 325, 326 of the adjacent joining links of the first and second linkage subassemblies are not parallel, although close to parallel. Using the linkages which guide the drive rod along a linear path through its central drive range, the drive rod may travel through the outer linear drive motor portion without the need for bearings or bushings between the outer motor portion and the drive rod.

Although the drive rods 312, 313 are shown in FIG. 8 as simple rods, they are illustrative of motor drive rods as discussed above. In some aspects, the linked dual drive system of FIG. 8 would further have motor external drive portions around each of the drive rods. The drive rods may have a plurality of magnets and iron rings, and the motor external drive portions may have a plurality of windings which are coupled to drive electronics. In some aspects, the drive rods may extend past the one or more of the drive link bearings 340, 341, 342, 343 such that the drive rods may power an external device or mechanism.

Figure 9:
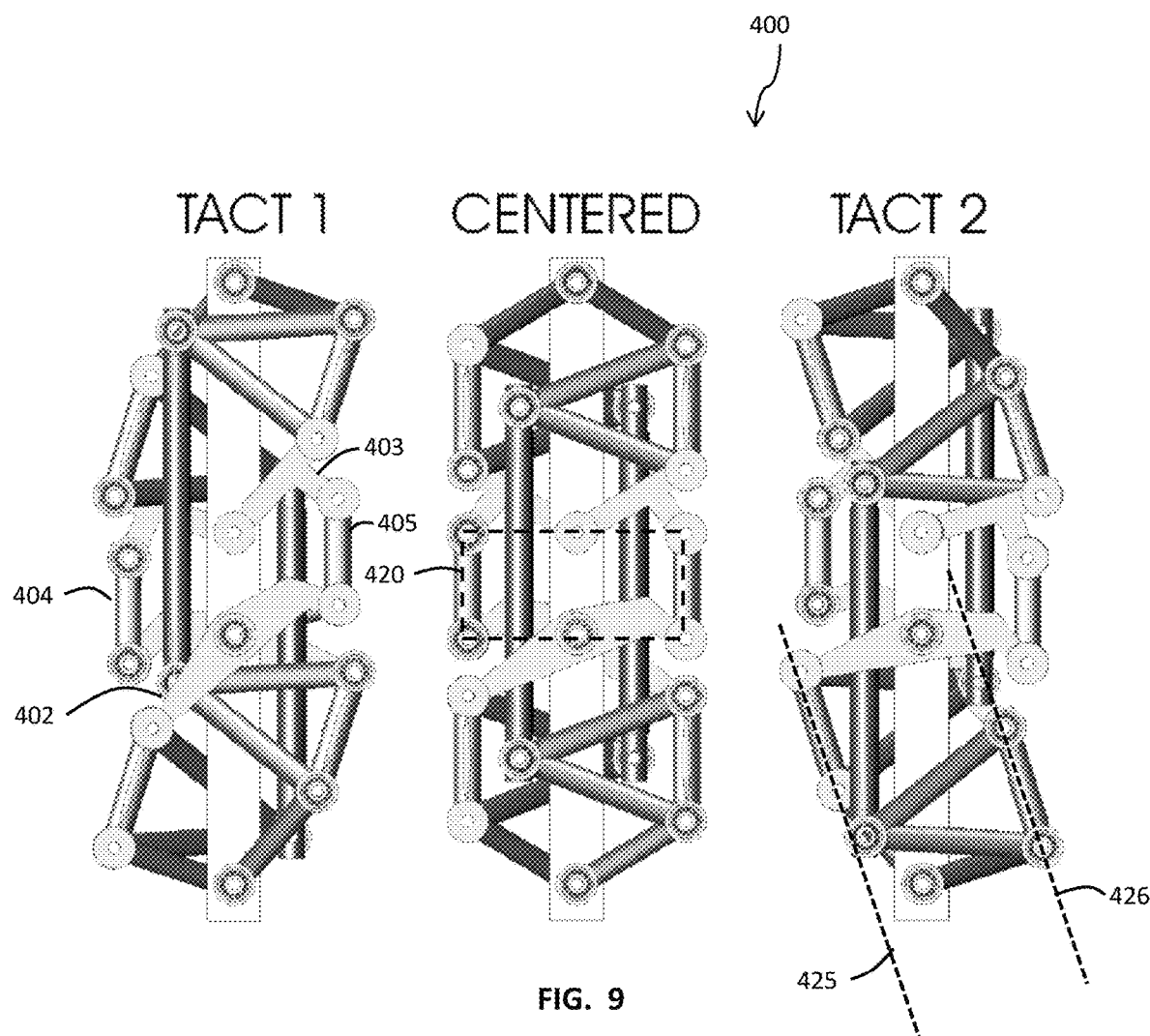
FIG. 9 is a view of a linearly driven linkage based dual system according to some embodiments of the present invention.

In some embodiments of the present invention, as seen in FIG. 9, an optimized linked dual linear drive system 400 couples the motion of the first linear drive system to the second linear drive system in a manner which keeps the position and speeds of the first and second linear drive systems equal and opposite. In this configuration, the first linkage subassembly and the second linkage subassembly are joined together such that the position and speed of the first and second drive rod are equal and opposite. An additional set of links 404, 405 are used to link the upper link sets to the lower link sets, and cross-links 402 couple the lower end of the links 404, 405 across to the other linkage subassembly. Of note, in a centered position, the pivot axis at each end of the links 404, 405 are in line vertically with the pivots axis of the coupling of the base links to the joining links, and are inline horizontally with the pivot axis of the base links to the base structure. This relationship is illustrated by the rectangle 420 of FIG. 9.

Figure 10:
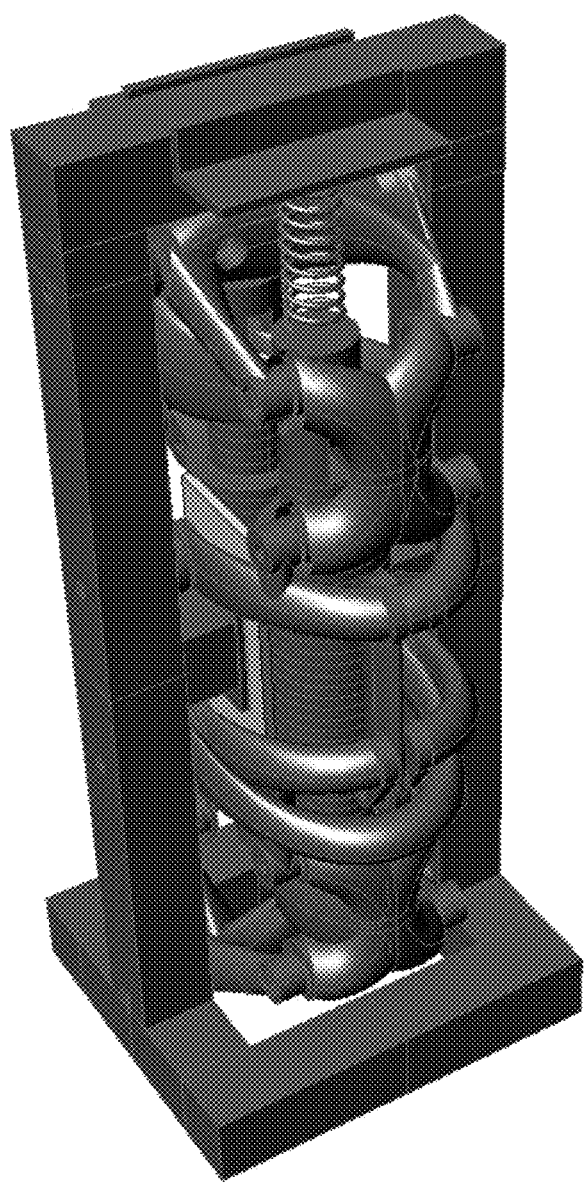
FIG. 10 is a view of a linearly driven linkage based dual system according to some embodiments of the present invention.
Figure 11:
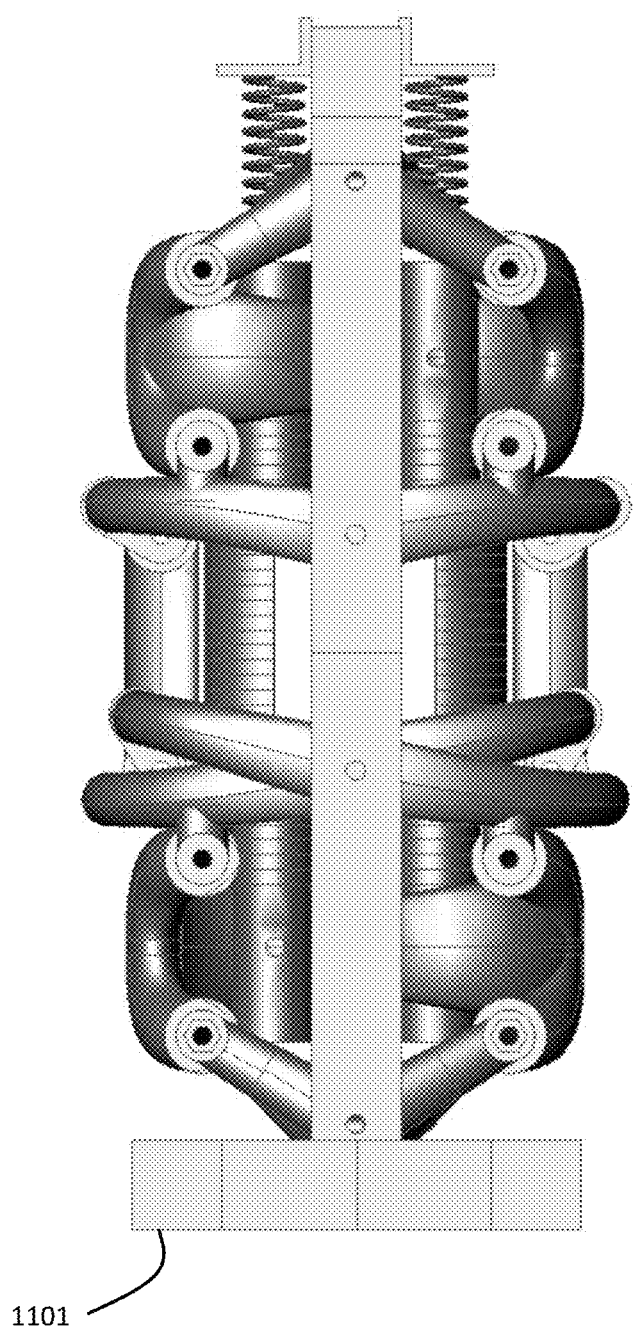
FIG. 11 is a view of a linearly driven linkage based dual system according to some embodiments of the present invention.
Figure 12:
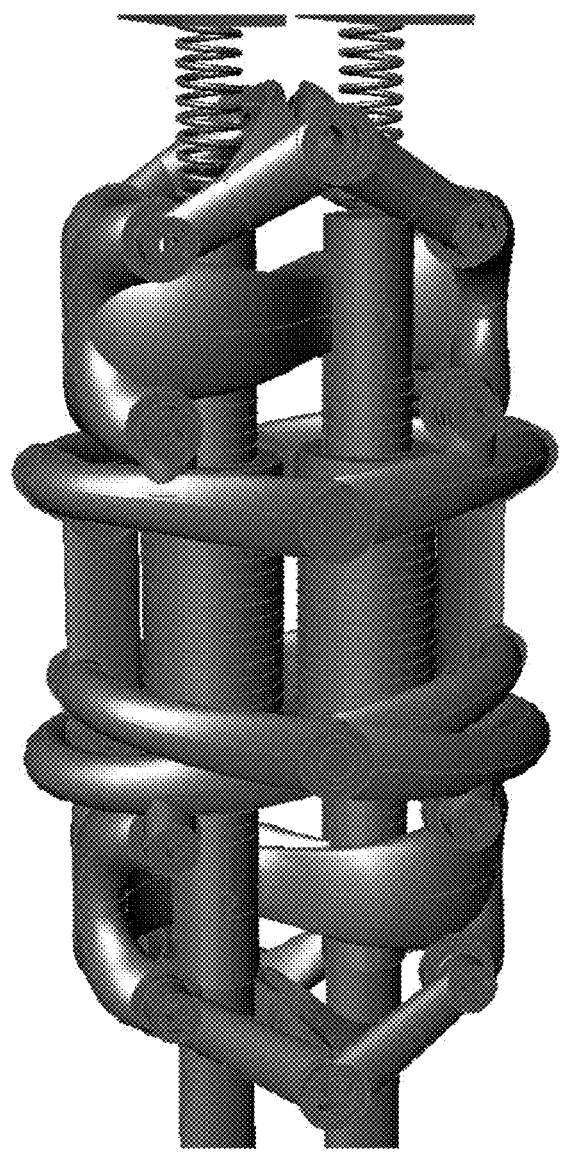
FIG. 12 is a partial view of a linearly driven linkage based dual system according to some embodiments of the present invention.
Figure 13:
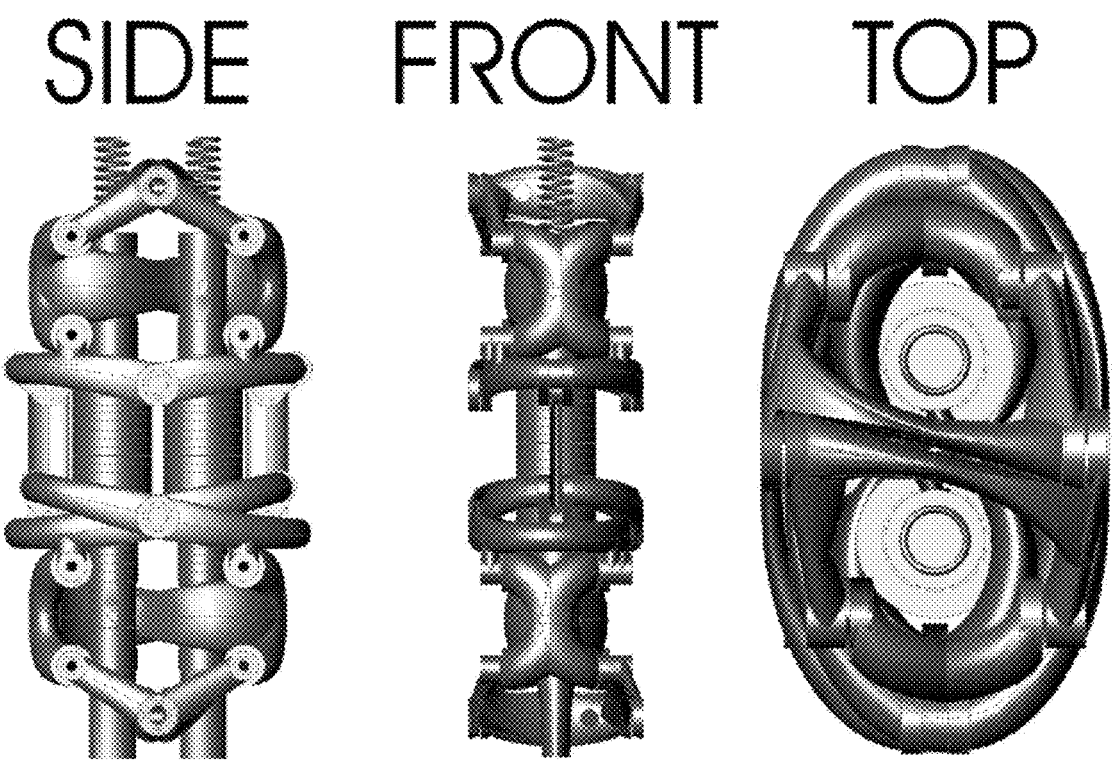
FIG. 13 are views of a linearly driven linkage based dual system according to some embodiments of the present invention.

FIGS. 10-13 illustrate embodiments of very compact linked dual drive systems according to some embodiments of the present invention. FIGS. 10 and 11 illustrate the system with its main base structure 1101, which can be seen as the square-tubes structure residing outside of the linkages. FIGS. 12 and 13 illustrate the system with the main base structure omitted for clarity, allowing for observation of the very complex linkage structure. In these exemplary views, the linkages are designed to occupy a very significant majority of the internal space while providing clearance for the moving linkage pieces and the drive rods. These large linkages can then take very large loads and provide significant stiffness.

Figure 14:
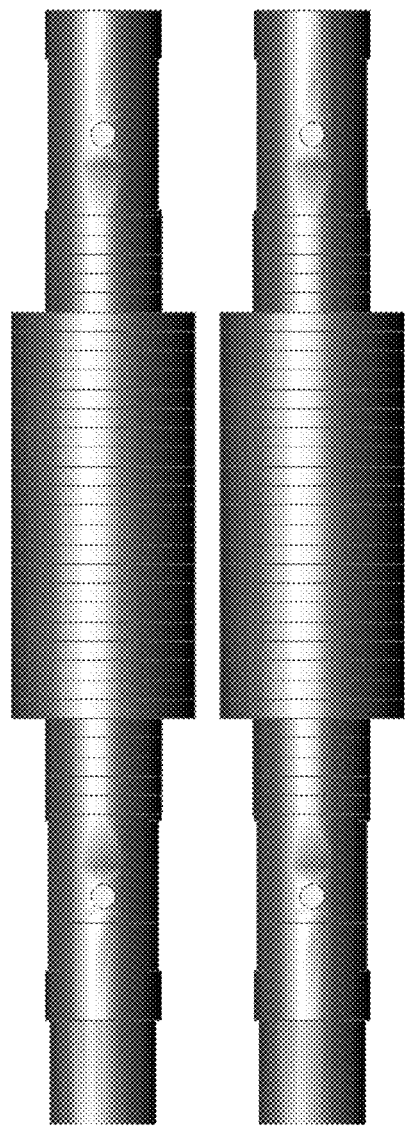
FIG. 14 a view of dual linear drives according to some embodiments of the present invention.
Figure 15:
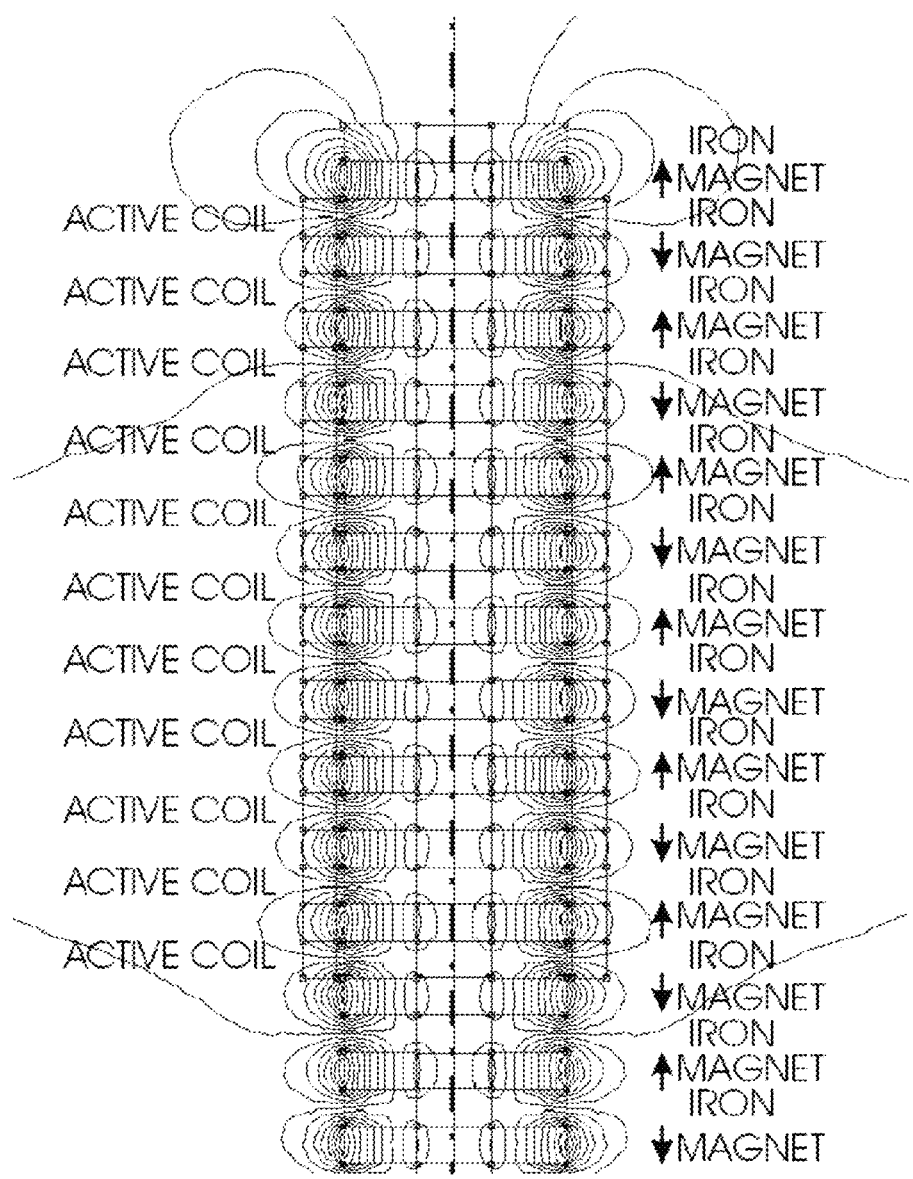
FIG. 15 a view of a drive system according to some embodiments of the present invention.
Figure 16:
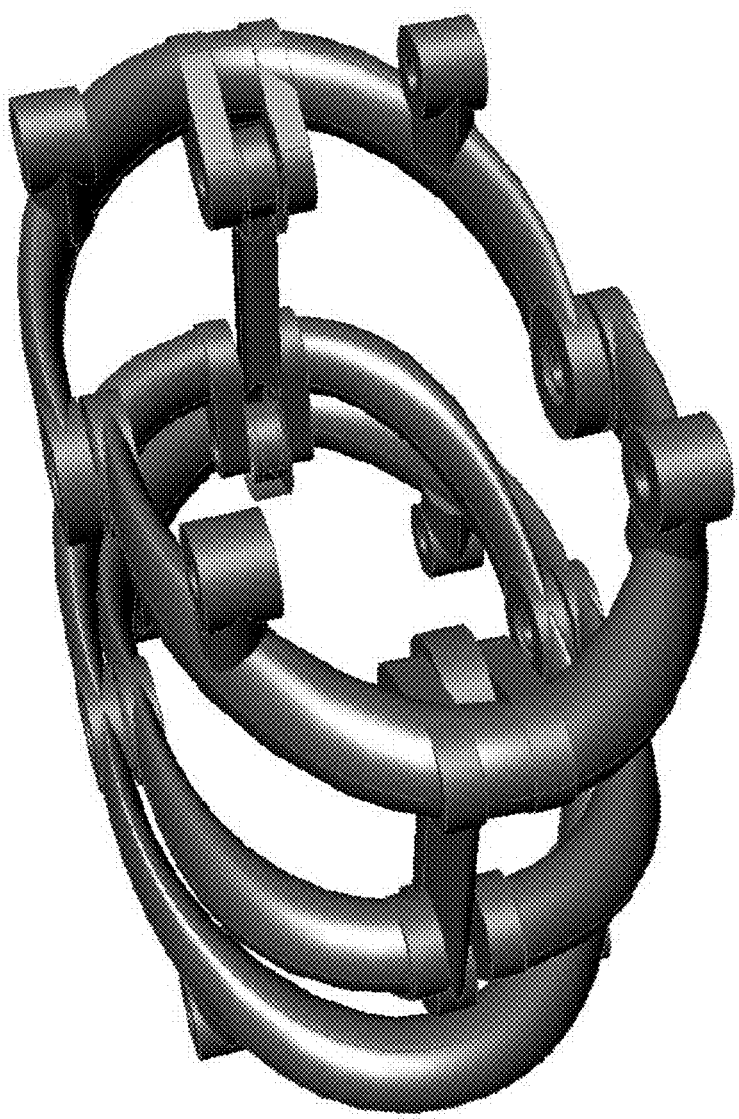
FIG. 16 is a view of linkage components according to some embodiments of the present invention.
Figure 17:
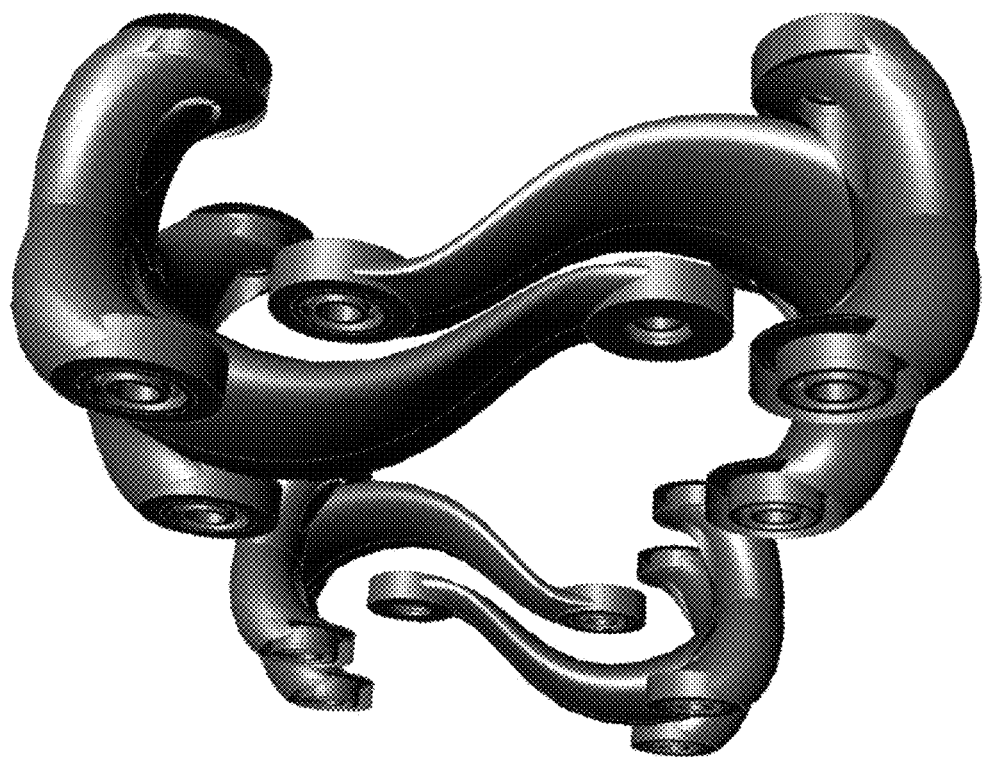
FIG. 17 is a view of linkage components according to some embodiments of the present invention.
Figure 18:
FIG. 18 is a view of linkage components according to some embodiments of the present invention.
Figure 19A:
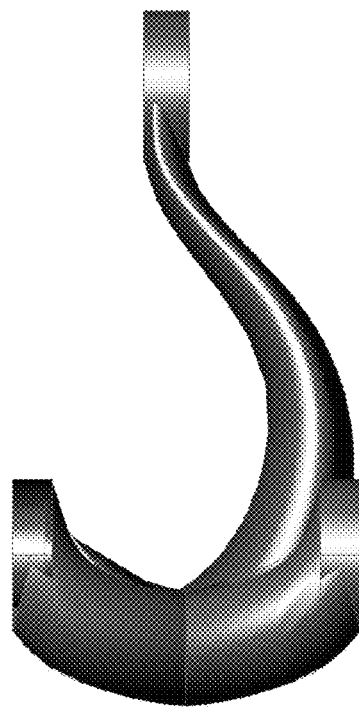
FIG. 19A-B are views of linkage components according to some embodiments of the present invention.
Figure 19B:
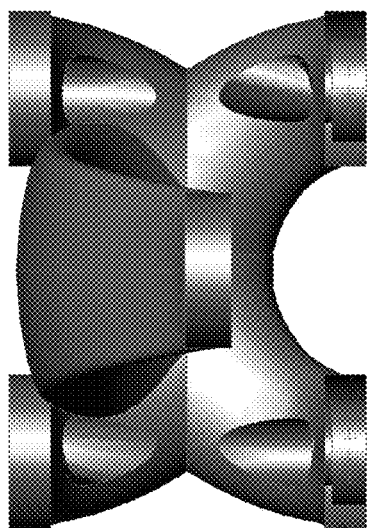
Figure 20:
FIG. 20 is a view of linkage components according to some embodiments of the present invention.

FIGS. 14 and 15 illustrate aspects of the linear drive motor according to some embodiments of the present invention. In the illustrative view of FIG. 14, the drive rods, which may have a plurality of magnets along their length, are adapted to travel within the exterior motor portion, which may have a plurality of windings. In some aspects, the drive rods extend in order to provide drive power to a device or mechanism. In the illustrative view of FIG. 15, the active coils reside within the motor external drive portion, which is fixedly coupled to a base support structure. The drive rod may have a plurality of magnets, which may be iron magnets, such that electrical impulses sent to the windings in sequence result in the motion of the drive rod along the drive axis. In some aspects, coils of the first and second stators can be connected to the same controller, as the desired motions and speeds are equal and opposite. The coils of the first and second stators would be coupled in reverse order vertically.

FIGS. 16-20 illustrate components of the very compact linked dual drive systems according to some embodiments of the present invention. The various components may be combined to form the very compact linked dual drive system of FIGS. 10-13.

Figure 21:
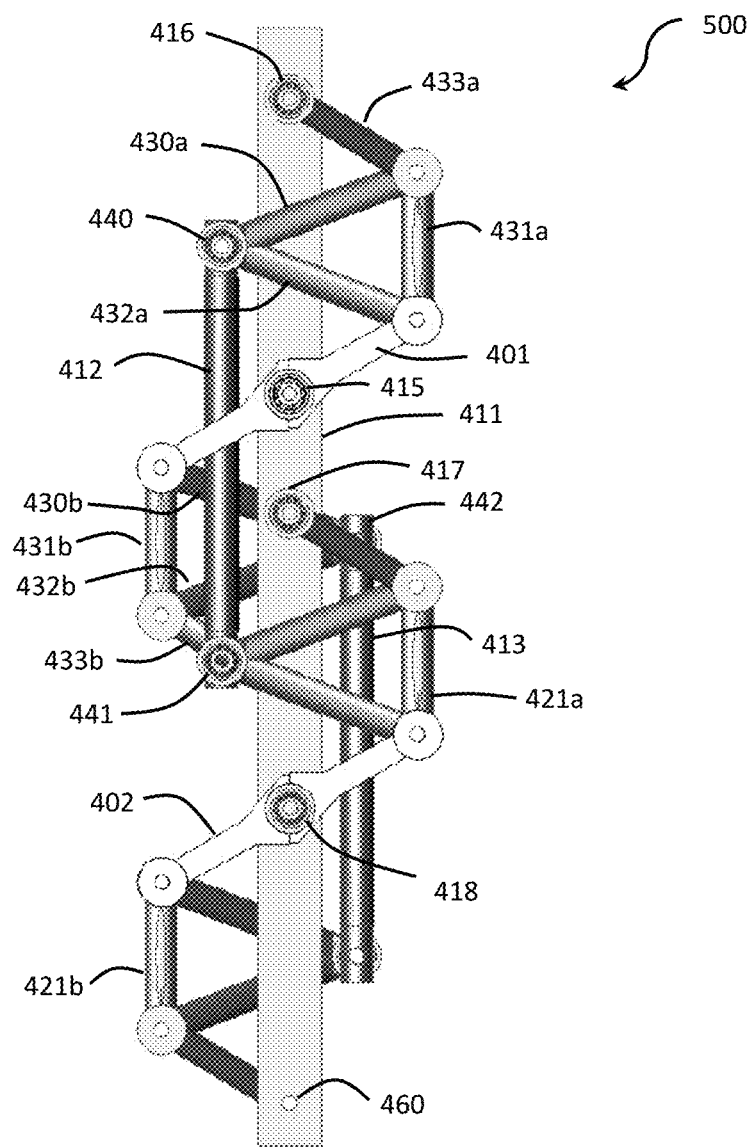
FIG. 21 is a view of a linearly driven linkage based dual system according to some embodiments of the present invention.

In some embodiments of the present invention, as seen in FIG. 21, a linked dual linear drive system 500 couples the motion of the first linear drive system to the second linear drive system in an extended fashion. A first linkage subassembly of the first linear drive system consists of a base link 433a which is pivotally coupled to the base structure 411 at a first end with a base bearing 416. A joining link 431a is pivotally coupled to the second end of the base link. The rod links 430a, 432a are of the same length and are also pivotally coupled to the second ends of the base links and then are pivotally coupled together and to a first end of the drive rod 412 with a drive link bearing 440. The other base link 401, however, is a coupled base link which couples the motion of the first linear drive system to the second linear drive system.

A first linkage subassembly of the second linear drive system consists of a base link 433b which is pivotally coupled to the base structure 411 at a first end with a base bearing. A joining link 431b is pivotally coupled to the second end of the base link. The rod links 430b, 432b are of the same length and are also pivotally coupled to the second ends of the base links and then are pivotally coupled together and to a first end of the drive rod 413 with a drive link bearing 442. The other base link 401, however, is a coupled base link which couples the motion of the second linear drive system to the first linear drive system Similarly, a second linkage subassembly of the first linear drive system is pivotally coupled to the second end of the drive rod 412 with a bearing 441, and to the base structure 411. The base bearings 415, 416, 417, 418, 460 are in linear relationship. A joining link 421a is pivotally coupled to the second end of a base link. A joining link 402 couples the second linkage subassembly of the first linear drive system to the second linkage subassembly of the second linear drive system. The second linkage subassembly of the second linear drive system has a coupled joining link.

Figure 22:
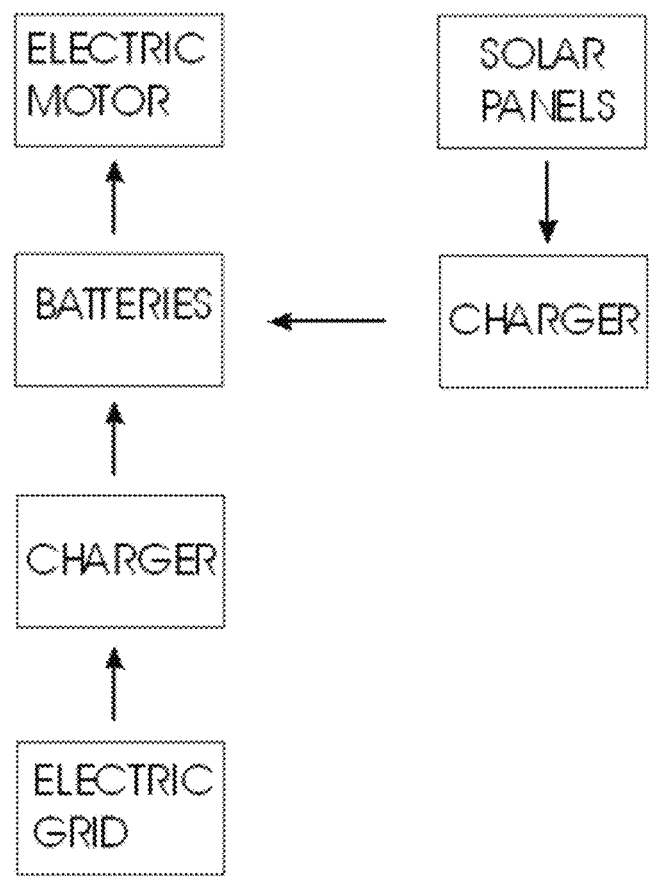
FIG. 22 is a block diagram of a drive system according to some embodiments of the present invention.
Figure 23:
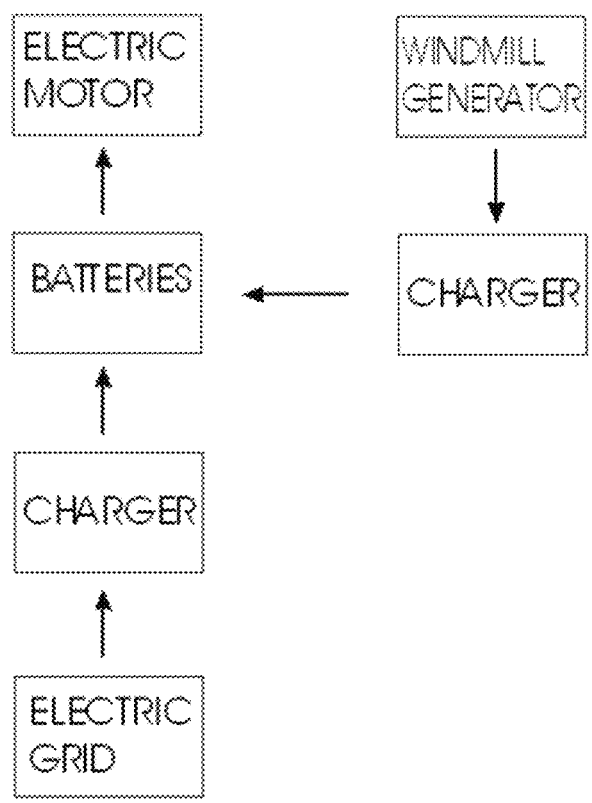
FIG. 23 is a block diagram of a drive system according to some embodiments of the present invention.

FIGS. 22 and 23 illustrate exemplary power systems that may be used with embodiments of the present invention.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A dual linear drive system, said system comprising:
   a base structure;
   a first drive system, said first drive system comprising:
      a first linkage subassembly, said first linkage subassembly comprising:
         a first base link pivotally coupled to said base structure at a first end of said first base link;
         a second base link pivotally coupled to said base structure at a first end of said base link;
         a first joining link pivotally coupled to a second end of said first base link at a first end of said first joining link and pivotally coupled to a second end of said second base link at a second end of said first joining link;
         a first rod link pivotally coupled to said first end of said first joining link at a first end and pivotally coupled to a first pivot of a first drive rod on a second end; and
         a second rod link pivotally coupled to said second end of said first joining link at a first end and pivotally coupled to the & first pivot of & said first drive rod on a second end:
      a first linear drive motor, said first linear drive motor comprising:
         a first inner portion coupled to said first drive rod; and
         a first outer portion rigidly coupled to said base structure,
   wherein said; and
      a second linkage subassembly, said second linkage subassembly comprising:
         a third base link pivotally coupled to said base structure at a first end of said third base link;
         a fourth base link pivotally coupled to said base structure at a first end of said fourth base link;
         a second joining link pivotally coupled to a second end of said third base link at a first end of said second joining link and pivotally coupled to a second end of said fourth base link at a second end of said second joining link;
         a third rod link pivotally coupled to said first end of said second joining link at a first end and pivotally coupled to a second pivot of said first drive rod on a second end; and
         a fourth rod link pivotally coupled to said second end of said second joining link at a first end and pivotally coupled to the second pivot of the first drive rod on a second end,
   wherein said first pivot of said first drive rod is on a first end of said inner portion of said first linear drive motor, and wherein said second pivot of said first drive rod is on a second end of said inner portion of said first linear drive motor; and
   a second drive system, said second drive system comprising:
      a third linkage subassembly, said third linkage subassembly comprising:
         a fifth base link pivotally coupled to said base structure at a first end of said fifth base link;
         a sixth base link pivotally coupled to said base structure at a first end of said sixth base link;
         a third joining link pivotally coupled to a second end of said fifth base link at a first end of said third joining link and pivotally coupled to a second end of said sixth base link at a second end of said third joining link;
         a fifth rod link pivotally coupled to said first end of said third joining link at a first end and pivotally coupled to a first pivot of a second drive rod on a second end; and
         a sixth rod link pivotally coupled to said second end of said third joining link at a first end and pivotally coupled to the first pivot of the second drive rod on a second end;
      a second linear drive motor, said second linear drive motor comprising:
         a second inner portion coupled to said second drive rod; and
         a second outer portion rigidly coupled to said base structure; and
      a fourth linkage subassembly, said fourth linkage subassembly comprising:
         a seventh base link pivotally coupled to said base structure at a first end of said seventh base link;
         an eighth base link pivotally coupled to said base structure at a first end of said eighth base link;
         a fourth joining link pivotally coupled to a second end of said seventh base link at a first end of said fourth joining link and pivotally coupled to a second end of said eighth base link at a second end of said fourth joining link;
         a seventh rod link pivotally coupled to said first end of said fourth joining link at a first end and pivotally coupled to a second pivot of said second drive rod on a second end; and
         an eighth rod link pivotally coupled to said second end of said fourth joining link at a first end and pivotally coupled to said second pivot of said second drive rod on a second end,
   wherein said first pivot of said second drive rod is on a first end of said inner portion of said second linear drive motor, and wherein said second pivot of said second drive rod is on a second end of said inner portion of said second linear drive motor,
   and wherein said first drive rod and said third joining link and said fourth joining link are on opposing sides of said base structure from said second drive rod and said first joining link and said second joining link, and wherein said first base link and said fifth base link pivot coaxially at said base structure and wherein said second base link and said sixth base link pivot coaxially at said base structure, and wherein said third base link and said seventh base link pivot coaxially at said base structure, and wherein said fourth base link and said eighth base link pivot coaxially at said base structure.

2. The dual linear drive system of claim 1 further comprising a linkage structure coupling said first drive system to said second drive system, wherein motion of said first drive rod results in motion in a reverse direction of said second drive rod.

3. A dual linear drive system, said system comprising:
a first drive system comprising:
a main base structure;
a first linear drive motor, said first linear drive motor having a first drive axis, said first linear drive motor comprising:
a first external drive portion, said first external drive portion comprising a plurality of windings, said first external drive portion fixedly coupled to said main base structure; and
a first drive rod, said first drive rod comprising a plurality of magnets, said first drive rod adapted to be driven within said first external drive portion along said first drive axis;
a second drive system comprising:
a second linear drive motor, said second linear drive motor having a second drive axis, said first second drive motor comprising:
a second external drive portion, said second external drive portion comprising a plurality of windings, said second external drive portion fixedly coupled to a main base structure; and
a second drive rod, said second drive rod comprising a plurality of magnets, said second drive rod adapted to be driven within said second external drive portion along said second drive axis; and
a first linkage assembly, said first linkage assembly pivotally coupled to said first drive rod at a first location outside of a first end of said first external drive, said first linkage assembly pivotally coupled to said main structure, such that said first drive rod is adapted to move in a linear fashion along said first drive axis as said first linkage assembly pivots through a central drive range, said first linkage assembly comprising:
a first base link pivotally coupled to said base structure at a first end of said first base link;
a second base link pivotally coupled to said base structure at a first end of said base link;
a first composite link, said first composite link comprising:
a first joining portion pivotally coupled to a second end of said first base link;
a second joining portion pivotally coupled to a first pivot of the first drive rod on a second end; and
a third joining portion pivotally coupled to said second end of said second base link;
a second linkage assembly, said second linkage assembly pivotally coupled to a second end of said first drive rod, said second linkage assembly comprising:
a third base link pivotally coupled to said base structure at a first end of said third base link;
a fourth base link pivotally coupled to said base structure at a first end of said fourth base link;
a second composite link, said second composite link comprising:
a first joining portion pivotally coupled to a second end of said third base link;
a second joining portion pivotally coupled to a second pivot of the first drive rod; and
a third joining portion pivotally coupled to said second end of said fourth base link;
a third linkage assembly, said third linkage assembly comprising:
a fifth base link pivotally coupled to said base structure at a first end of said fifth base link;
a sixth base link pivotally coupled to said base structure at a first end of said sixth base link;
a third composite link, said third composite link comprising:
a first joining portion pivotally coupled to a second end of said fifth base link;
a second joining portion pivotally coupled to a first pivot of the second drive rod; and
a third joining portion pivotally coupled to said second end of said sixth base link; and
a fourth linkage assembly, said fourth linkage assembly comprising:
a seventh base link pivotally coupled to said base structure at a first end of said seventh base link;
an eighth base link pivotally coupled to said base structure at a first end of said eighth base link;
a fourth composite link, said fourth composite link comprising:
a first joining portion pivotally coupled to a second end of said seventh base link;
a second joining portion pivotally coupled to a second pivot of the second drive rod; and
a third joining portion pivotally coupled to said second end of said eighth base link.

4. The dual linear drive system of claim 3 further comprising a linkage structure coupling said first drive system to said second drive system, wherein motion of said first drive rod results in motion in a reverse direction of said second drive rod.

* * * * *